Figure 1:
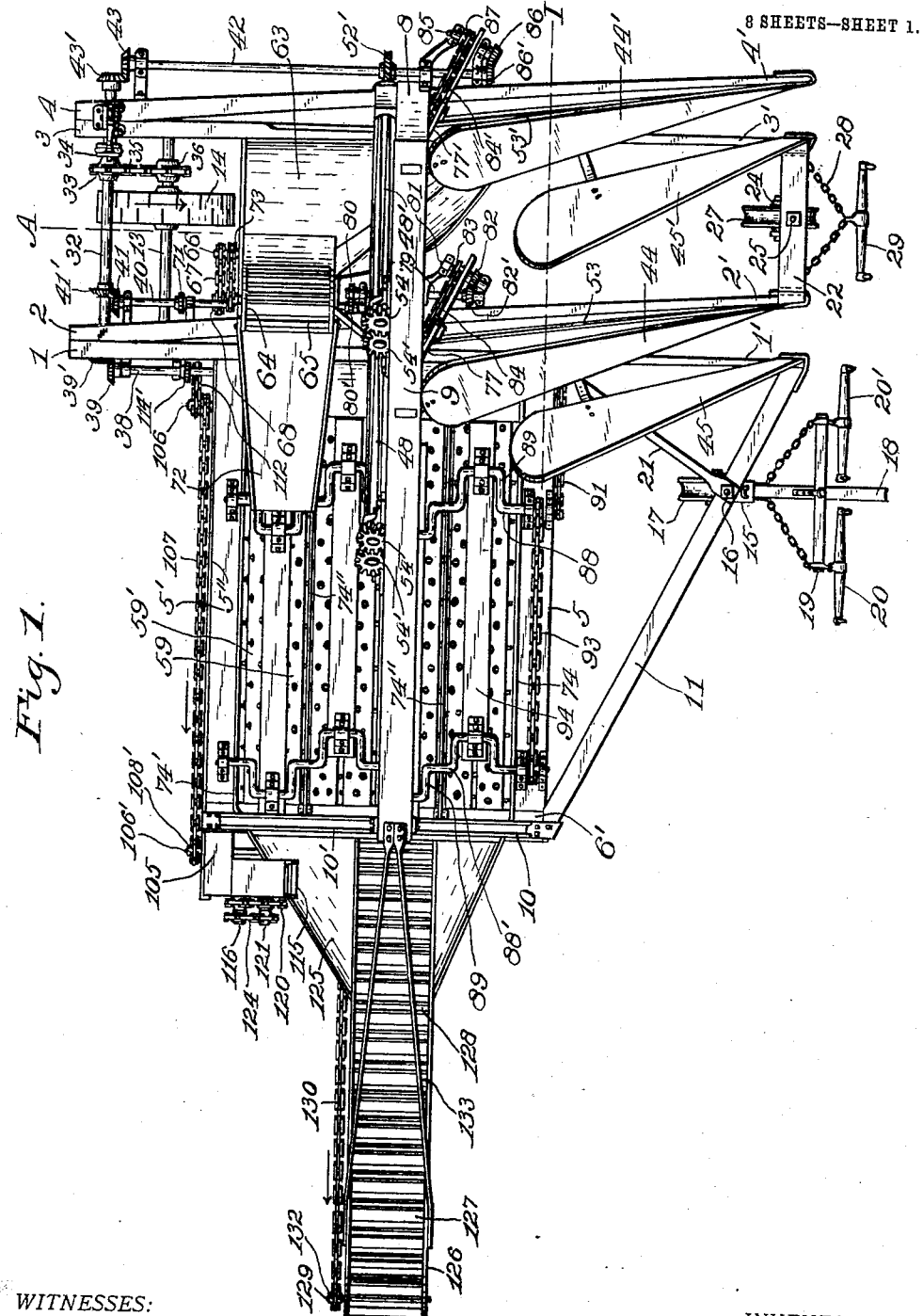

E. C. DEAN.
CORN GATHERER AND HUSKER.
APPLICATION FILED MAY 15, 1908.

909,560.

Patented Jan. 12, 1909.

8 SHEETS—SHEET 1.

WITNESSES:
J. H. Gardner
K. R. Woddell.

INVENTOR:
Elmer C. Dean,
BY
E. T. Silvius,
ATTORNEY.

E. C. DEAN.
CORN GATHERER AND HUSKER.
APPLICATION FILED MAY 15, 1908.

909,560.

Patented Jan. 12, 1909.

8 SHEETS—SHEET 2.

WITNESSES:
J. H. Gardner
R. R. Woddell

INVENTOR:
Elmer C. Dean,
BY
E. T. Silvius,
ATTORNEY.

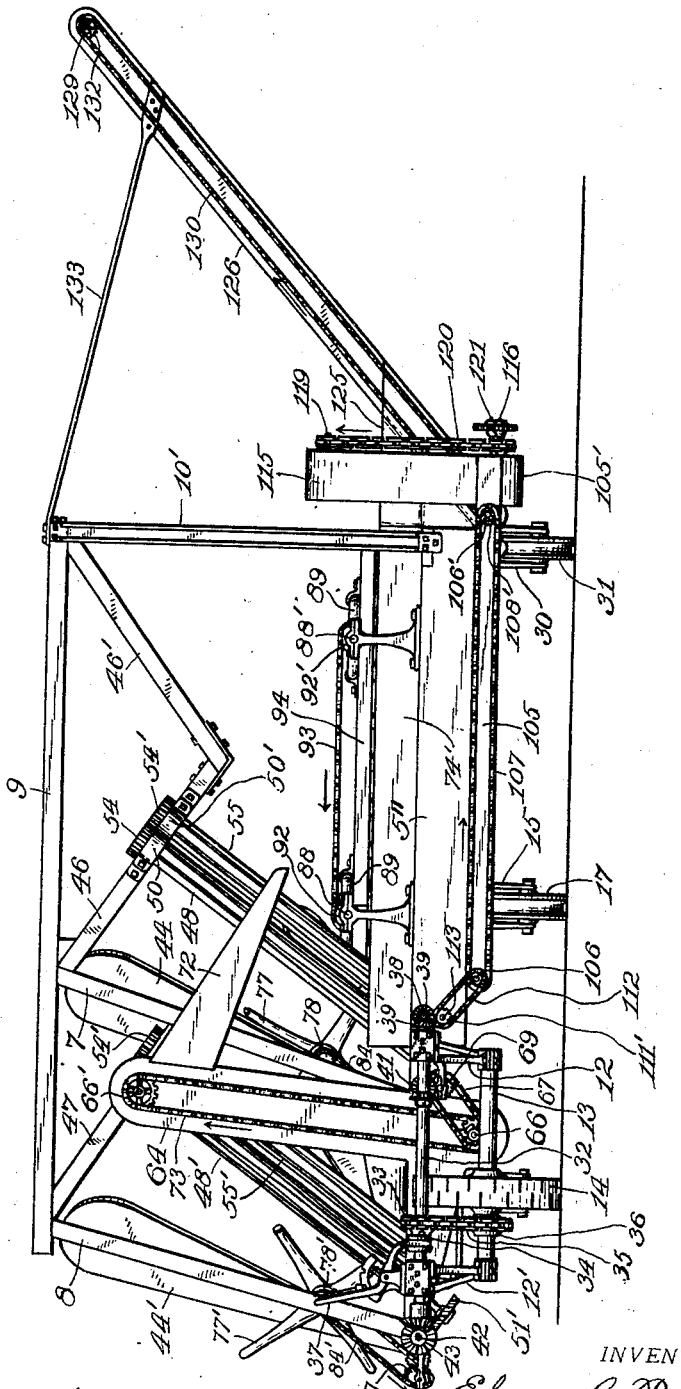

E. C. DEAN.
CORN GATHERER AND HUSKER.
APPLICATION FILED MAY 15, 1908.
909,560.
Patented Jan. 12, 1909.
8 SHEETS—SHEET 4.
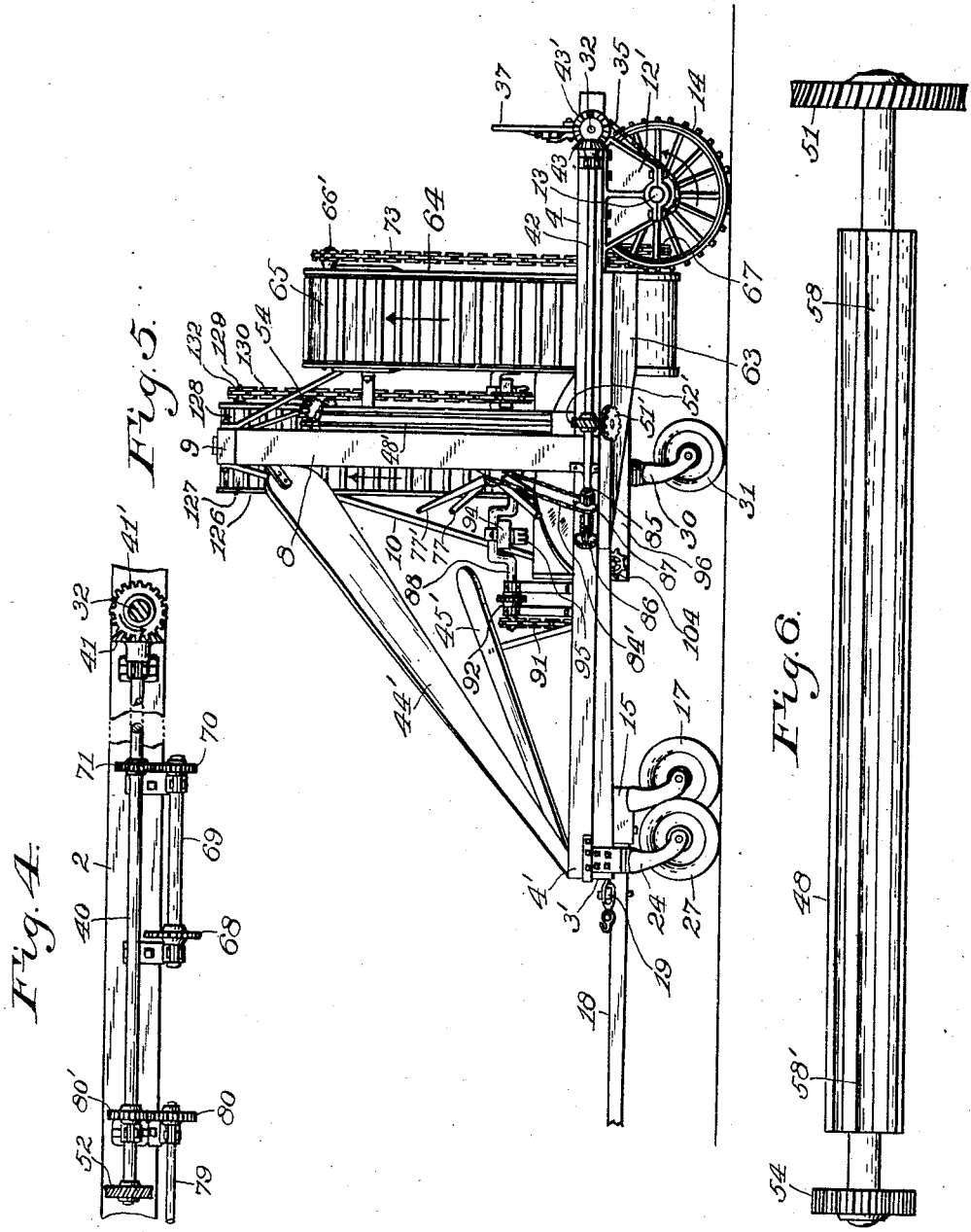
WITNESSES:
J. H. Gardner
K. R. Woddell
INVENTOR:
Elmer C. Dean,
BY
E. T. Silvius,
ATTORNEY.

E. C. DEAN.
CORN GATHERER AND HUSKER.
APPLICATION FILED MAY 15, 1908
909,560.
Patented Jan. 12, 1909.
8 SHEETS—SHEET 5.
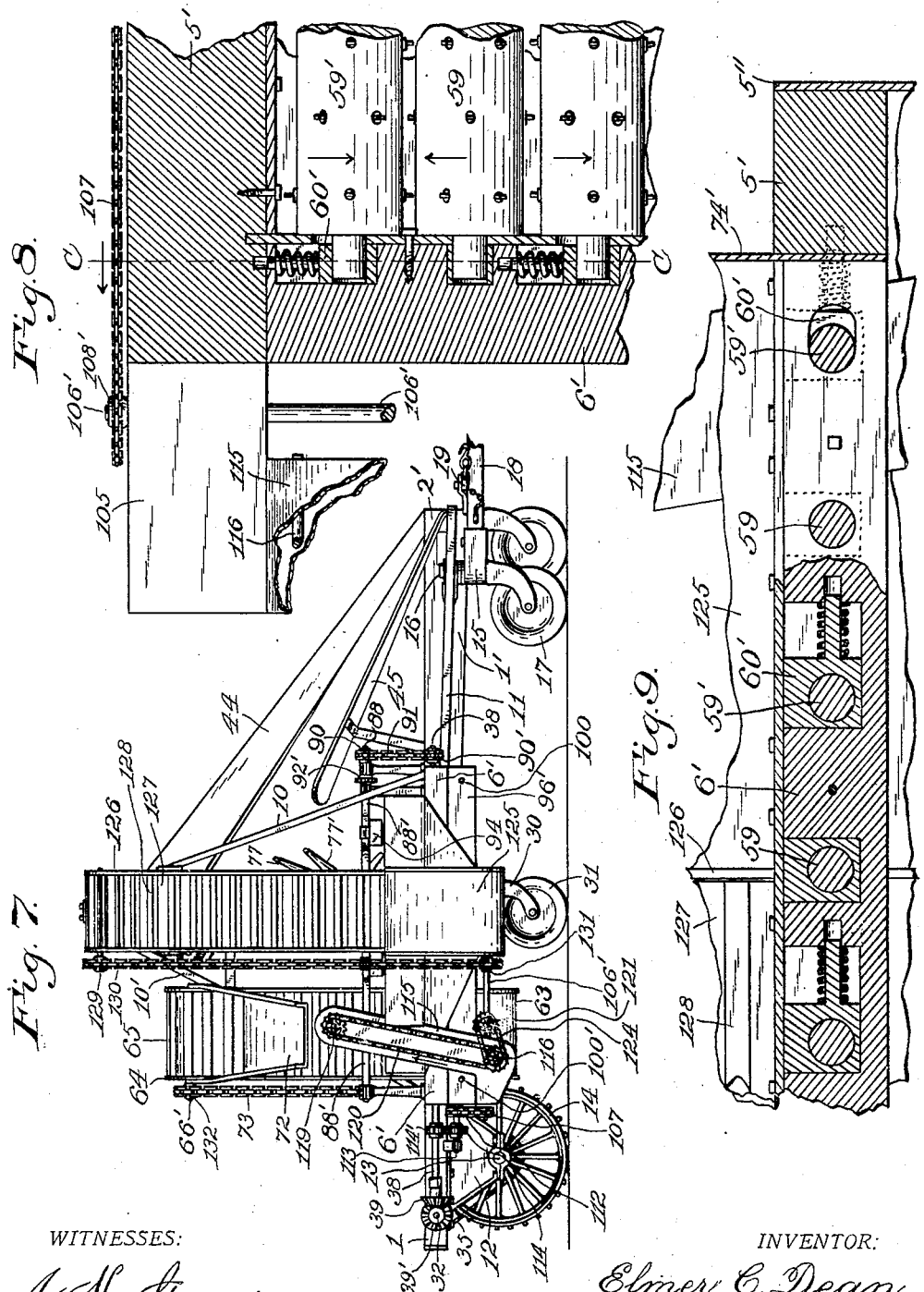
WITNESSES:
J. H. Gardner
K. R. Woddell
INVENTOR:
Elmer C. Dean,
BY
E. T. Silvius,
ATTORNEY.

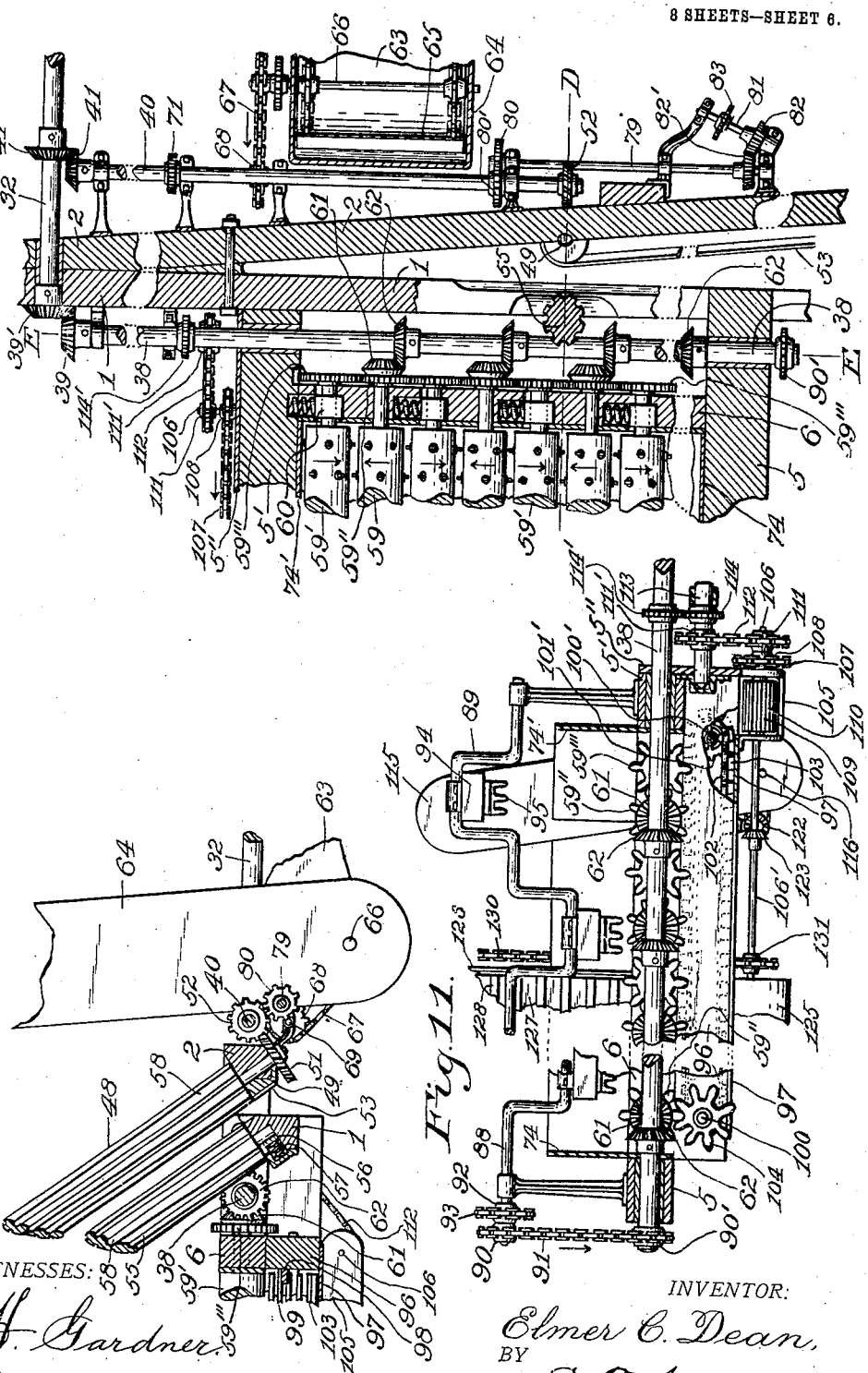

E. C. DEAN.
CORN GATHERER AND HUSKER.
APPLICATION FILED MAY 15, 1908.
909,560.
Patented Jan. 12, 1909.
8 SHEETS—SHEET 7.
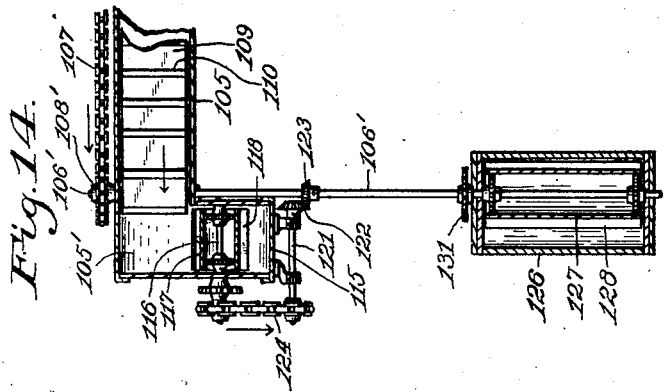
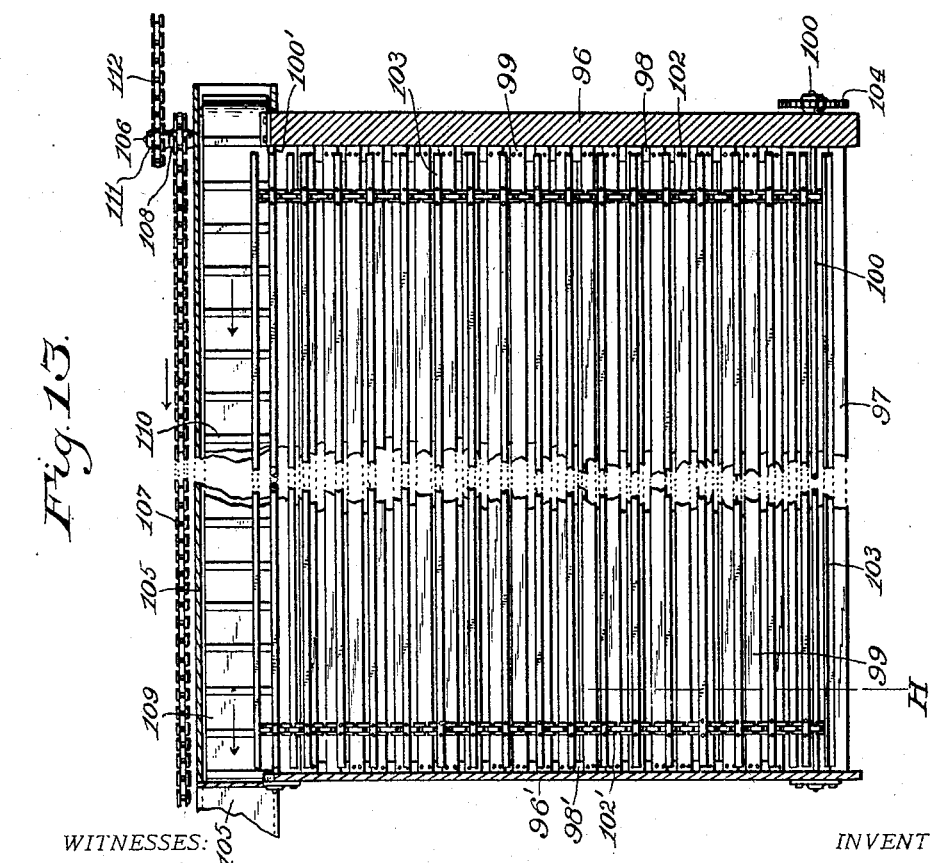
WITNESSES:
J. H. Gardner
K. R. Woddell
INVENTOR:
Elmer C. Dean,
BY E. T. Silvius,
ATTORNEY.

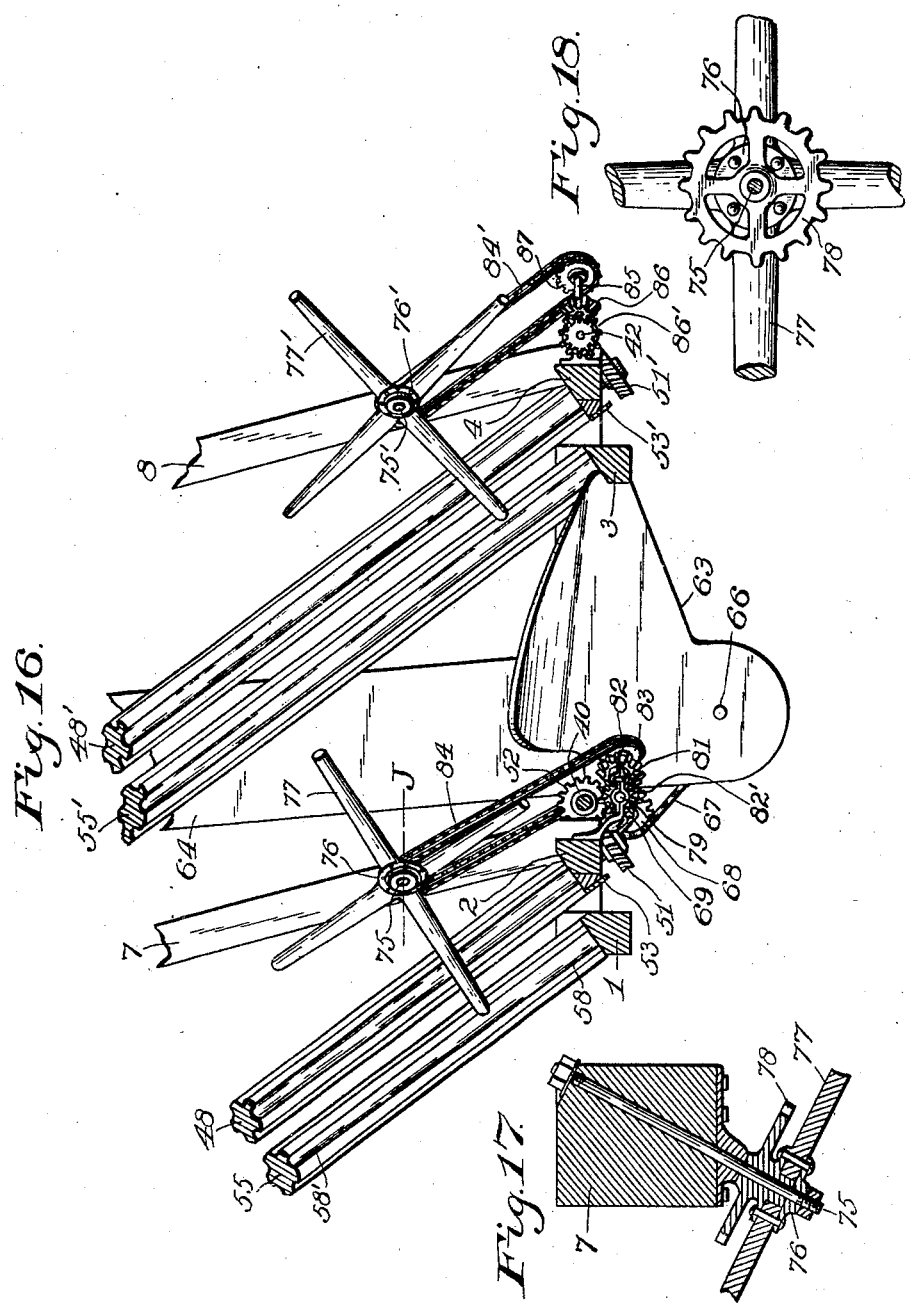

UNITED STATES PATENT OFFICE.

ELMER C. DEAN, OF WARREN TOWNSHIP, CLINTON COUNTY, INDIANA.

CORN GATHERER AND HUSKER.

No. 909,560.  Specification of Letters Patent.  Patented Jan. 12, 1909.

Application filed May 15, 1908. Serial No. 433,021.

*To all whom it may concern:*

Be it known that I, ELMER C. DEAN, a citizen of the United States, residing in Warren township, in the county of Clinton and State of Indiana, have invented certain new and useful Improvements in Corn Gatherers and Huskers; and I do declare the following to be a full, clear, and exact description of the invention, reference being had to the accompanying drawings, and to the letters and figures of reference marked thereon, which form a part of this specification.

This invention relates to machines for gathering corn in the husks from the cornstalks in fields and husking corn and delivering the same to wagons which may accompany the machines in operation, the invention having reference more particularly to corn gatherers and huskers that are adapted to gather from two rows of cornstalks, the invention having reference also to mechanism whereby the ears of corn are delivered to one set of husking rolls; and further the invention relates to apparatus whereby the husked ear corn and the corn that may be acidentally shelled in the husking operations are brought together and delivered from the machine.

The object of invention is to provide an improved corn gatherer and husker that may be constructed at reasonable cost and that will be highly efficient and durable and economical in use, for taking the corn away and leaving the stalks and husks in the fields where grown.

The invention consists in an improved machine comprising a plurality of pairs of snapping rolls, novel guides for flexing and guiding the corn-stalks to the snapping rolls, a plurality of pairs of husking rolls, apparatus for delivering the corn in the husks to the husking rolls, apparatus for conveying the husks away from the husking rolls and scattering them onto the ground, and apparatus for delivering the husked corn from the machine; and the invention consists further in the novel parts and in the combinations and arrangements of parts as hereinafter particularly described and defined in the appended claims.

Figure 2:
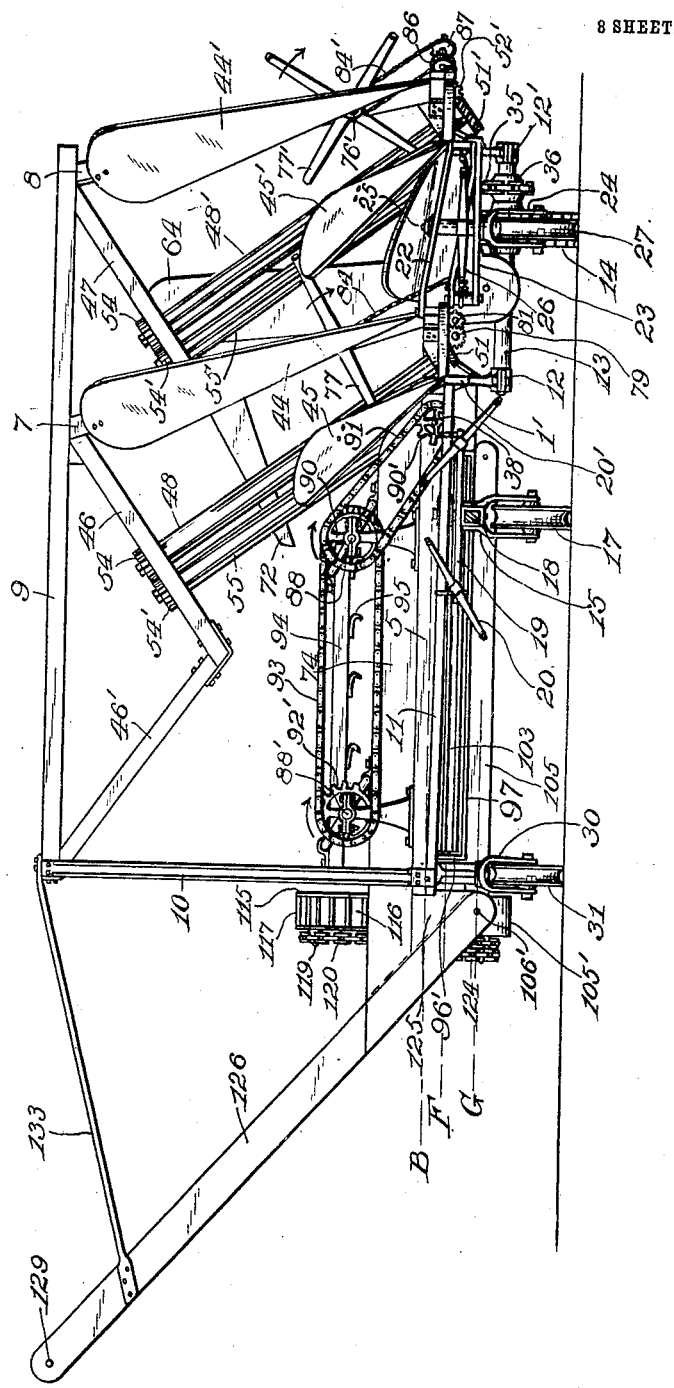

Referring to the drawings Figure 1 is a top plan of the machine constructed substantially in accordance with the invention; Fig. 2, a front elevation and Fig. 3 a rear elevation of the machine; Fig. 4, a fragmentary vertical sectional view approximately on the plane of the line A in Fig. 1; Fig. 5, an elevation of the machine showing the left hand side thereof; Fig. 6, a side view of one of the snapping rolls; Fig. 7, an elevation of the right-hand side of the machine; Fig. 8, a fragmentary horizontal sectional view approximately on the plane of the line B in Fig. 2; Fig. 9, a fragmentary vertical sectional view approximately on the plane of the line C C in Fig. 8; Fig. 10, a fragmentary vertical sectional view (approximately on the plane of the line D in Fig. 12); Fig. 11, a fragmentary vertical sectional view (approximately on the plane of the line E E in Fig. 12); Fig. 12, a fragmentary horizontal sectional view approximately on the plane of the line B in Fig. 2; Fig. 13, a fragmentary horizontal sectional view approximately on the plane of the line F in Fig. 2; Fig. 14, a fragmentary horizontal sectional view on the plane of the line G in Fig. 2; Fig. 15, a fragmentary vertical sectional view as on the plane of the line H in Fig. 13; Fig. 16, a fragmentary vertical sectional view as on the plane of the line I in Fig. 1; Fig. 17, a fragmentary horizontal sectional view approximately on the plane of the line J in Fig. 16; and Fig. 18, a fragmentary rear elevation of parts, of the mechanism shown in the preceding figure.

Similar reference characters throughout the various figures of the drawings indicate corresponding elements or features of construction.

In practically carrying out the objects of the invention a main frame is provided, which may be variously constructed in detail, and it comprises two horizontal members 1 and 2 having each an end thereof attached to the end of the other member at the rear end of the machine, the two members being divergent and the forward end portions thereof forming guides 1' and 2' a suitable distance apart to gather the cornstalks and guide them to snapping rolls; also two similar members 3 and 4 having their rear ends connected together and their forward end portions forming guides 3' and 4' to guide the stalks of another row to other snapping rolls. The ends of the guides 1' and 3' are preferably slightly lower than the ends of the companion guides. The frame comprises also a husking roll frame having two parallel members 5 and 5' that are connected to and extend from the member 1 approximately at right-angles thereto and have other members 6 and 6' attached thereto that extend parallel to the member 1, the member 5' having a vertical plate 5'' on the rear side thereof and extending downward therefrom. A post 7 extends from the member 2 upward and a post 8 extends upward from a member 4, the posts preferably being inclined, and a cap-beam 9 is attached to the tops of the posts and extends over above the member 6' of the frame and has two inclined posts 10 and 10' connected thereto and supported on the members 5 and 5' or on the ends of the member 6'. An angle member 11 extends from the forward end of the member 6' to the end of the guide 1', being forward of the member 5 and at acute-angles thereto and to the guide 1'. The rear end of the frame is provided with a pair of housings 12 and 12' under the members 1 and 2 and the members 3 and 4 respectively, and a main axle 13 is journaled in the housings, there being a main wheel 14 secured to the axle for carrying the rear end of the frame and driving the mechanism of the machine. A wheel frame 15 is connected by a pivot 16 to the member 11 and has a wheel 17 mounted therein for carrying the forward portion of the main part of the machine, there being a tongue 18 attached to the frame 15 and having a double-tree 19 thereon to which is connected a pair of swingle-trees 20 and 20' for draft purposes, the tongue enabling the draft animals to guide the machine, but it will be understood of course that the machine may be drawn by other than animal power. A draft-rod 21 is connected to the member 11 preferably at the pivot 16 and extends rearward to any other suitable part of the frame, as to the member 1. A frame member 22 is attached to the ends of the guide members 2' and 3', the guide members having also a frame member 23 connected thereto below the member 22, and a wheel frame 24 is connected by a pivot 25 to the members 22 and 23, there being an equalizing-beam 26 on the pivot, a wheel being mounted in the frame 24. A draft chain 28 is connected to the equalizing-beam 26 and has a swingle-tree 29 connected thereto, the arrangement being such as to enable the draft animal to turn the frame 24 by means of the equalizing-beam to assist in guiding the machine when in operation. Another wheel frame 30 is suitably mounted pivotally under the member 6' of the frame and has a wheel 31 mounted therein for carrying the delivery side of the machine. The wheels 17, 27 and 31 are arranged in their frame rearward of the pivots of the frames, the frames being suitably designed for the purpose.

In order to drive the various machinery a transverse shaft 32 is rotatively mounted on the rear parts of the frame members 1 and 2 and the members 3 and 4, respectively, and has a sprocket-wheel 33 mounted thereon and adapted to be locked thereto by a clutch 34 which may release the sprocket wheel from the shaft when desired, as when moving the machine from one field to another, there being a sprocket chain 35 connected to the sprocket wheel 33 and connected also to a sprocket wheel 36 that is attached to the axle 13 for normally driving the shaft 32. It will be understood, of course, that such clutch devices might be arranged on the axle in connection with the sprocket wheel 36 instead of being on the shaft 32 as shown, the details of such devices being well known. The clutch is provided with a suitable operating lever 37. A longitudinal shaft 38 is mounted rotatively alongside of the member 1 and extends through the members 5 and 5' between the member 1 and the member 6 of the frame, and has a miter-wheel 39 attached thereto that is in engagement with a miter-wheel 39' that is secured to the shaft 32. Another longitudinal shaft 40 is rotatively mounted on the farther side of the member 2 and has a miter-wheel 41 attached thereto that is in engagement with a miter-wheel 41 that is secured to the shaft 32. A third longitudinal shaft 42 is mounted rotatively on the outer side of the frame member 4 and has a miter-wheel 43 secured thereto that is in engagement with a miter-wheel 43' that is secured to the shaft 32.

The machine is provided at its forward end with two pairs of guide plates that extend upward and rearward from the ends of the guide members, one guide plate 44 being connected to the end of the guide member 2' and extending up to the upper portion of the post 7, and another guide plate 45 extending from the end of the guide member 1' upward opposite to the plate 44 but at an angle less inclined than the plate 44. The plate 44 extends across the opening between the guide members 1' and 2' so as to bend the corn-stalks laterally over the guide member 1' and in some cases onto the plate 45. Another guide plate 44' extends from the end of the guide member 4' upward and rearward over the guide member 3' to the post 8, and an opposite guide plate 45' extends upward and rearward from the end of the guide member 3' to support the stalks that may be bent over by the guide plate 44'. The guide plates are preferably metallic and twisted so that the flat sides thereof will be presented to the corn-stalks.

A frame member 46 extends downward at an angle from the top of the post 7 under the cap-beam 9 and has a member 46' attached to the lower ends thereof and connected to the cap-beam 9, and a frame member 47 extends from the top of the post 8 downward under the cap-beam 9 at a suitable angle to the post 7. A snapping roll 48 is journaled at its lower end on the frame member 2 and extends upward at a laterally inclined angle to the frame member 46, a similar snapping roll 48' being journaled on the frame member 4 and extending upward at a laterally inclined angle to the frame member 47, suitable journal boxes 49 being provided for the lower ends of the snapping rolls, and a journal box 50 for the upper ends thereof mounted on the incline frame members. The lower end of the snapping roll 48 is provided with a worm-wheel 51 that is engaged by a worm-wheel 52 which is secured to the shaft 40, and the snapping roll 48' is provided with a worm-wheel 51' that is engaged by a worm-wheel 52' which is secured to the shaft 42; suitable guide-bars 53 and 53' extend from the ends of the guide members 2' and 4' respectively back to the lower journal boxes of the snapping rolls. The upper end of each snapping roll 48 and 48' is provided with a gear wheel 54. The snapping roll 55 is journaled in a movable box 56 that is mounted in the frame member 1 and normally pressed by a spring 57 towards the opposite snapping roll 48, the upper end of the snapping roll being journaled in a box 50' and having a gear wheel 54' attached thereto that is engaged by the gear wheel 54. Another snapping roll 55' is similarly journaled in the frame member 3 and the member 47 opposite to the snapping roll 48' and has a gear wheel 54' in engagement with the gear wheel 54 of the roll 48'. Each snapping roll as 48 has longitudinal grooves, the lower ends 58 of which are broad and close together and the upper ends 58' relatively narrower and farther apart, the lower end portions of the grooves being deeper than the remaining portions of the grooves so as to prevent choking of the rolls by accumulation of ears of corn or by relatively large ears.

A suitable number of pairs of husking rolls as 59 and 59' are arranged horizontally and mounted rotatively in the frame members 6 and 6' and each pair are connected together by gear wheels 59'' and 59''', one roll of each pair being mounted in suitable spring pressed boxes 60 and 60' and the other roll having a miter-wheel 61 thereon that is in engagement with a miter-wheel 62 which is attached to the shaft 38. The husking rolls, as will be seen, are so arranged that the ears of corn may drop from the snapping rolls 48 and 55 onto the husking rolls, and a receptacle 63 is arranged to receive the ears from the other pair of snapping rolls 48' and 55', the receptacle having a slanting bottom leading to an elevator frame 64 that is suitably supported on the frame of the machine and has a conveyer 65 mounted therein that is driven by a shaft 66 and runs over a shaft 66' at the top of the elevator frame. The conveyer apparatus may be variously constructed to lift the corn, and the shaft 66 is driven by a sprocket chain 67 that is connected to a sprocket wheel 68 attached to a counter shaft 69 mounted on the frame member 2 and having a gear wheel 70 that is engaged by a gear wheel 71 secured to the shaft 40, the shaft 66 being provided with a suitable sprocket wheel on which the chain 67 is connected. A spout 72 is connected to the upper portion of the elevator frame 64 to receive the corn and it extends over the rearmost ones of the husking rolls so that the corn will fall thereon, the foremost husking rolls receiving the corn from the adjacent snapping rolls. In some cases the shaft 66' is driven by a chain 73 and the shaft 66. Sideboards 74 and 74' are provided to prevent the corn from rolling off of the husking rolls, and guide bars 74'' are provided, one between each two pairs of the husking rolls, to properly guide the ears of corn on the uppermost sides of the husking rolls.

An axle 75 is mounted on the post 7 and a similar axle 75' is mounted on the post 8 somewhat higher than the frame members 2 and 4, the axles being preferably horizontal and extending angularly to the plane of the posts, and hubs 76 and 76' are mounted on the axles rotatively and have each a suitable number of arms as 77 or 77' attached thereto radiately, each hub having a sprocket wheel 78 or 78' attached thereto. A counter shaft 79 is rotatively mounted on the frame member 2 and has a gear wheel 80 thereon that is engaged by a gear wheel 80' secured to the shaft 40 for driving the counter shaft. Another counter shaft 81 is rotatively mounted also on the frame member 2 by means of suitable bearings and has a bevel gear wheel 82 secured thereto that is engaged by a bevel gear wheel 82' which is secured to the counter shaft 79, the counter shaft 81 having also a sprocket wheel 83 attached thereto on which is connected a sprocket chain 84 that is connected to the sprocket wheel 78 to turn the hub 76 so that the arms 77 will be moved upward at the front of the snapping rolls 48 and 55. The counter shaft 81 is horizontal but at an angle to the counter shaft 79 so as to be parallel to the axle 75. A counter shaft 85 is suitably mounted rotatively on the frame member 4 at an angle to the shaft 42 and has a bevel wheel 86 attached thereto that is engaged by a bevel gear wheel 86' secured to the shaft 42, the counter shaft 85 having a sprocket wheel 87 attached thereto, to which is connected a sprocket chain 84' which is connected to the sprocket wheel 78 for operating the arms 77'.

A pair of rotative shafts 88 and 88' are suitably mounted on the members 5 and 5' of the frame so as to extend across and above the plurality of husking rolls, each shaft having a plurality of double cranks 89 formed thereon. The shaft 88 is provided with a sprocket wheel 90 on which is a drive chain 91 that is connected to a sprocket wheel 90' which is secured to the shaft 38. The shaft 88 is provided also with a sprocket wheel 92 and the shaft 88' with a sprocket wheel 92', the sprocket wheels being connected by a sprocket chain 93 so that the shafts 88 and 88' rotate in unison. A suitable number of bars 94 are provided, one above each pair of husking rolls, and connected to cranks of the two shafts 88 and 88', each bar having a suitable number of slightly elastic hooks 95 mounted on the under side thereof, so that when the bars are carried around near to the husking rolls the hooks will draw the ears of corn towards the outer ends of the husking rolls for delivery. A conveyer frame is mounted under the husking roll frame and comprises two side members 96 and 96' that extend longitudinally with the line of movement of the machine and have a bottom 97 attached thereto, and are provided also with bearing strips 98 and 98' on which strips 99 are secured to form a grating. A pair of rotative shafts 100 and 100' are mounted in the members 96 and 96' at opposite ends thereof and have each a suitable number of sprocket wheels, as 101 or 101' secured thereto on which are mounted conveyer chains 102 and 102' having flights 103 attached thereto to be drawn along the bottom 97 towards the rearward end thereof, the chains passing across the strips 99 and carrying the flights towards the forward end of the conveyer frame. A gear wheel 104 is attached to the shaft 100 and is engaged by a gear wheel 59'' of one of the husking rolls to be driven thereby, the shaft 100 being arranged below the husking roll. By this arrangement the husks will drop from the husking rolls onto the conveyer flights and be carried forward and dropped onto the ground, and the shelled corn dropping from the husking rolls will pass between the strips 99 and fall onto the bottom 97 to be carried rearward, there being a conveyer trough 105 arranged transversely of the machine at the rear end of the bottom 97 and below the plane thereof, suitable rotative shafts 106 and 106' being mounted at opposite ends of the trough, shaft 106' extending a suitable distance forward of the trough, the two shafts being connected together by a sprocket chain 107 running over sprocket wheels 108 and 108' that are attached to the shafts.

The conveyer comprises a belt 109 that is carried by the shafts in a suitable manner and preferably has flights 110 thereon to carry the shelled corn to the delivery end 105' of the trough. The shaft 106 has a sprocket wheel 111 attached thereto on which is a drive chain 112 that is connected to a sprocket wheel 111' which is mounted on a suitably supported shaft 113 to be driven thereby, the shaft having a gear wheel 114 attached thereto that is in engagement with a gear wheel 114' which is secured to the shaft 38. An elevator is connected to the delivery end 105' and comprises an upright frame 115 at the bottom of which is a rotative shaft 116 adapted to drive a conveyer belt 117 provided with buckles 118 and running over a suitable shaft 119 at the top of the frame, the two shafts being preferably connected together by a drive chain 120 and suitable sprocket wheels. A counter shaft 121 is mounted on the exterior of the elevator frame and has a bevel gear wheel 122 attached thereto that is engaged by a bevel gear wheel 123 which is secured to the shaft 106', a drive chain 124 connecting the shafts 116 and 121. The elevator is adapted to deliver the shelled corn into a receptacle 125 arranged to receive the ear corn at the right-hand side of the machine. An elevator frame 126 extends upward in an inclined plane from the bottom of the receptacle and has a conveyer belt 127 mounted movably therein and provided with buckets 128 whereby to elevate the corn to be discharged into an accompanying wagon, the belt being suitably driven by the shaft 106' and a shaft 129 that is mounted in the upper end of the elevator frame, the two shafts being connected together to be driven in unison by means of a sprocket chain 130 connected with sprocket wheels 131 and 132. The frame is supported at its outer end by rods or links 133 that are connected thereto and also to the cap-beam 9.

It will be understood that various modifications in the details of construction may be made for operating the various parts, by means of the main axle 13 or by other suitable means, and of course it will be clear that the delivery elevator and the hopper or receptacle from which it elevates the corn may be suitably designed to be removed from the frame when not in use.

In practical use the machine will be drawn forward so as to gather the corn from two rows at a time, the rows being spaced apart so that the ends of the guides 1' and 2' will pass at opposite sides of one row and the ends of the guides 3' and 4' will pass at opposite sides of the other row, the guide plates that are connected to the guide members turning the tops of the corn-stalks over somewhat so as to be in proper position to be engaged by the snapping rolls between which the stalks are drawn and are also pushed by the arms 77 and 77', the snapping rolls pinching off the ears in their husks and the stalks passing between the lower ends of the snapping rolls and then bent forward nearly to the ground by the rear portions of the frame members 1 and 2, and 3 and 4. The ears that fall into the receptacle 63 will be elevated by the apparatus described and delivered to the husking rolls on which the ears will be husked in a well known manner by the husking rolls and the husks carried away onto the ground by the conveyer below the husking rolls, the hooks 95 drawing the husked ears out to the receptacle 125 which also receives what shelled corn there may be to be elevated by the buckets 128 and dropped into any suitable conveyance that may accompany the gatherer and husker.

Having thus described the invention what is claimed as new, is—

1. A corn gatherer including a portable frame, a pair of snapping rolls mounted rotatively on the frame with their axes inclined laterally and upwardly, a pair of guide members on the frame extending divergently forward beyond the snapping rolls and having each a guide connected thereto forward of the snapping rolls that extends rearward and laterally and upwardly towards the snapping rolls, and means for rotating the snapping rolls.

2. A corn gatherer including a portable frame, a pair of snapping rolls mounted rotatively on the frame with their axes inclined laterally and upwardly, each roll having grooves therein that are broader at the lower ends than at the upper ends of the rolls, a pair of guide members on the frame extending divergently forward beyond the snapping rolls and having each a guide connected thereto that extends rearward in the direction of the snapping rolls, and means for rotating the rolls.

3. A corn gatherer including a portable frame, a pair of snapping rolls mounted rotatively on the frame with their axes inclined laterally and upwardly, a pair of guide members on the frame extending divergently forward beyond the snapping rolls, one of the guide members having an upwardly and laterally inclined guide thereon that extends across above the other one of the pair of guide members towards the snapping rolls, a hub rotatively supported on the frame and having arms thereon that are movable upward opposite the forward sides of the snapping rolls, means for rotating the snapping rolls, and means for rotating the hub.

4. A corn gatherer including a portable frame, two pairs of snapping rolls mounted rotatively on the frame with their axes inclined laterally and upwardly, a pair of guide members on the frame extending divergently forward beyond one of the two pairs of snapping rolls, another pair of guide members on the frame extending divergently forward beyond the other pair of snapping rolls, one of each pair of guide members having an upwardly and laterally inclined guide thereon extending across above the other one of the pair of guide members towards one pair of snapping rolls, two hubs mounted rotatively on the frame, one near each pair of snapping rolls and each having arms thereon that are movable upward opposite the forward sides of the adjacent snapping rolls, gearing for rotating the two pairs of snapping rolls in unison, and gearing for rotating the two hubs in unison with the snapping rolls.

5. A corn gatherer and husker including a frame, wheels supporting the frame, a pair of snapping rolls mounted on the frame with their axes inclined upwardly and laterally, a pair of guide members on the frame extending divergently forward beyond the rolls and one of the guide members having an upwardly and laterally inclined guide thereon extending rearward across above the other one of the guide members towards the snapping rolls, a hub rotatively supported on the frame and having arms thereon movable upward opposite the forward sides of the snapping rolls, a plurality of husking rolls mounted on the frame to receive ears dropping from the snapping rolls, a pair of rotative cranked shafts mounted above the husking rolls transversely thereof, bars mounted on the cranks of the shafts, and spring-hooks mounted on the under sides of the bars.

6. A corn gatherer and husker including a frame, wheels supporting the frame, two pairs of laterally and upwardly inclined snapping rolls mounted on the frame with spaces between the supports of the lower ends of each pair of the snapping rolls, two pairs of guide members on the frame, each guide member extending forward beyond one of the snapping rolls, two hubs mounted rotatively on the frame and each having arms thereon movable upward at the forward sides of a pair of the snapping rolls, a plurality of husking rolls mounted on the frame near one pair of the snapping rolls, a receptacle on the frame near the other pair of snapping rolls, an elevator to receive from the receptacle and deliver to the husking rolls, a conveyer mounted under the husking rolls, a delivery receptacle at the ends of the husking rolls, and an elevator connected with the delivery receptacle.

7. A corn gatherer and husker including a main frame mounted on wheels, two pairs of laterally and upwardly inclined snapping rolls mounted on the frame, two pairs of guide members on the frame extending forward beyond the lower ends of the snapping rolls, a plurality of husking rolls mounted on the frame near one of the pairs of snapping rolls, a receptacle on the frame near the other pair of snapping rolls, an elevator to receive from the receptacle and deliver to the husking rolls, two hubs each mounted rotatively on the frame near a pair of snapping rolls and having arms thereon to swing upward opposite to the adjacent pair of snapping rolls, a conveyer frame on the main frame below the plane of the husking rolls and having a bottom and also a slatted floor attached thereto, conveyer chains having flights thereon and mounted to move rearward on the bottom and forward on the slatted floor, a delivery receptacle at the ends of the husking rolls, a transversely-arranged conveyer at the rear end of the bottom of the conveyer frame, an elevator to receive from the transversely-arranged conveyer and deliver to the delivery receptacle, and an elevator to receive from the delivery receptacle.

8. In a corn gatherer, the combination of a frame comprising two longitudinal members arranged horizontally and the forward end portions of which form divergent guide members, a post on one of said members, a cap beam on the post, and a laterally inclined member extending downward from the beam; a snapping roll journaled on said one of the longitudinal members and leaning over the other one of the two longitudinal members, and another snapping roll journaled on the last mentioned one of the longitudinal members and extending upward under and substantially parallel to the first mentioned snapping roll, both of the snapping rolls being also journaled on said inclined member of the frame.

9. In a corn gatherer, the combination of a frame comprising two longitudinal members arranged horizontally and the forward ends of which form divergent guide members; a pair of snapping rolls, one roll mounted at one of its ends on one of said longitudinal members and the other roll mounted at one of its ends on the other one of the longitudinal members, said rolls being inclined laterally and upwardly one above the other one, an upwardly and laterally inclined guide on one of said guide members and extending upward over the other one of said guide members and rearward toward said snapping rolls, and means mounted on the frame providing bearings for the upper ends of said snapping rolls.

10. In a corn gatherer, the combination of a frame comprising two pairs of longitudinal members arranged horizontally and the forward end portions of each pair forming divergent guide members, the two inner of said guide members having a frame member attached thereto that is provided with a pivoted wheel frame, a carrying wheel mounted in the wheel frame; a wheel supporting the opposite or rear ends of the longitudinal members, and two pairs of snapping rolls mounted on the longitudinal members, a roll on each member inclined upwardly and laterally, one roll of each pair being above the other roll of the pair and extending over the one of the pair of longitudinal members adjacent to the one on which it is mounted.

11. In a corn gatherer, the combination of a frame comprising two pairs of longitudinal members arranged horizontally and the forward end portions of each pair forming divergent guide members; carrying wheels supporting the longitudinal members, two pairs of snapping rolls mounted on the longitudinal members, a roll to each member, all the rolls being inclined laterally and upwardly in one direction one of each pair substantially above the other one of the pair, and two pairs of guide plates attached to the forward ends of the guide members, a plate to each member, and extending rearward and upward and also laterally, each pair towards the upper portions of a pair of the snapping rolls.

12. In a corn gatherer, the combination with horizontal longitudinal frame members, two pairs of laterally and upwardly inclined snapping rolls mounted on the frame, and guides on the frame leading to the snapping rolls, of a husking roll frame attached to the outer side of one of the horizontal longitudinal frame members, a carrying wheel supporting the forward portions of the longitudinal members, a carrying wheel supporting the rear portions of the longitudinal members, a carrying wheel supporting the forward portion of the husking roll frame, a plurality of husking rolls mounted on the husking roll frame and extending transversely to the longitudinal members near one of the pairs of snapping rolls, a receptacle supported by a plurality of the longitudinal members under the other pair of snapping rolls, and an elevator connected with the receptacle and having a spout extending over a plurality of the longitudinal members and partially over a plurality of the husking rolls.

In testimony whereof I affix my signature in presence of two witnesses.

ELMER C. DEAN.

Witnesses:
 OWEN A. J. MORRISON,
 EDWIN M. CATRON.